United States Patent Office

2,824,023
Patented Feb. 18, 1958

2,824,023

PROCESS OF SIZING FILMS WITH POLYVINYL-ACETATE AND STARCH COMPOSITION

Thomas Franklin Banigan, Kenmore, N. Y., assignor to E. I. du Pont de Nemours and Company, Wilmington, Del., a corporation of Delaware No Drawing. Application December 13, 1955
Serial No. 552,732

5 Claims. (Cl. 117—65)

This invention relates to sizing of flexible, nonfibrous sheets and films of organic, polymeric, film-forming substances and, more particularly, to the sizing of flexible films made from thermoplastic, organic polymers to reduce blocking and to improve slip.

Flexible, nonfibrous sheets and films made from organic, film-forming substances such as regenerated cellulose, cellulose organic acid esters, cellulose ethers, polyvinyl halides, polyvinylidene halides, polyvinyl acetate, polyvinyl acetal, polyvinyl butyral, polyethylene, synthetic linear polyamides, rubber hydrochloride, butadiene-acrylonitrile, polyisobutylene, haloprenes, polyacrylic and methacrylic esters, polyethylene glycol esters and films coated with said materials have a tendency to suffer, in an untreated state, two serious disadvantages. These films tend to block and have poor slip. "Blocking" is the tendency of the film to adhere to itself when two or more surfaces of the film are held pressed together, e. g., when sheets of the film are stacked in storage. It is more pronounced when, in addition to pressure, the stack of sheets is kept warm. "Slip" may be defined as a measure of the ease with which two contacting surfaces of a film slide over each other or over some other surface when held in contact under constant pressure. It is usually measured as coefficient of friction. Poor film slip is of particular concern when the film is to be used in automatic packaging and wrapping machines.

It is common practice to overcome blocking and slip deficiencies by the dusting of film surfaces with particles of a dry material, by treatment with a liquid which will deposit solid foreign particles on the film, or by the incorporation of particles of solid materials in a coating composition. By covering the treated film with minute particles of these solid materials, the film surface is roughened to some extent and intimate contact between film surfaces or between the film and some other surface such as occurs in bag making, packaging, and wrapping machines, is prevented. Difficulties have been encountered, however, particularly when exceedingly smooth surfaced films such as polyethylene are used, where such known treatments have been employed. Dusting such films with powdered materials, for example, is likely to result in the loosely attached particles being rubbed off. When dusted film is printed on continuous printing machines, the dust particles also tend to adhere to the transferrent printing rolls from which they may become dislodged in flake form, causing unprinted spots in the film.

An object of this invention, therefore, is to provide flexible, nonfibrous, organic film surfaces having satisfactory slip characteristics and little, if any, tendency to blocking. Another object is to provide a process for preparing flexible, nonfibrous, organic, thermoplastic film whose surfaces have satisfactory slip characteristics and no tendency to blocking. These and other objects will more clearly appear hereinafter.

The above objects are realized by the present invention which, briefly stated, comprises spraying the surfaces of flexible nonfibrous sheets and films of organic, film-forming substances, e. g., polyethylene, with an aqueous dispersion containing (1) from 0.5% to 1.0% by weight, based on the total weight of solids in the dispersion, of particles of polyvinyl acetate at least 25%, by weight, of which have maximum diameters within the range of 0.5–1 micron, the remaining particles of polyvinyl acetate having a maximum particle diameter of from 1–30 microns, and (2) from 0.25% to 1.0%, by weight of starch particles, and thereafter drying said sheets at an elevated temperature sufficient to soften the polyvinyl chloride particles.

The treatment of this invention will substantially inhibit the blocking tendencies and will improve the slip characteristics of all nonfibrous, organic films and, particularly, thermoplastic or thermoplastic-coated, organic films. As representative film there may be cited films of polyethylene, polyethylene terephthalate, cellulose esters, coated cellophane, rubber hydrochloride, polyvinylidene chloride and its copolymers, fluorine containing vinyl polymers, polyvinyl chloride and its copolymers, etc. Because of the present commercial importance of polyethylene film, and because it is a type of film most difficult to satisfactorily size, the present invention will be further described with specific reference to polyethylene film, i. e., film having as its major constituent the normally solid, crystalline polymer of the formula $(CH_2)_x$, formed by the polymerization of ethylene in known manner.

Invention herein is grounded on the discovery that the combination of polyvinyl acetate particles of critical size range, and starch particles in aqueous dispersion, when sprayed on the film surface and dried under the specified conditions, results in a sized film having improved slip and substantially reduced blocking tendencies without impaired heat-sealability, clarity, flexibility, or other desirable characteristics of the film. And, most importantly, the sizing particles are adhered tenaciously to the film surface. It is believed that the sub-micron (less than 1 micron in maximum dimension) particles of polyvinyl acetate serve to anchor the starch particles and the larger particles of polyvinyl acetate to the surface of the film, and these anchored particles in turn serve to impart anti-blocking and enhanced slip properties to the treated surfaces.

The size of the polyvinyl acetate particles employed is critical in providing for good slip. Although the polymeric dispersion need not consist entirely of sub-micron particles (0.05–1 micron), and may consist also, in large degree, of spherical or spheroidal particles ranging up to about 30 microns diameter, it is essential that the sizing composition contain at least 25% by weight, based on the total weight of polymer particles, of sub-micron particles in order to act as a binder for the coarser polymeric particles present and the slip-promoting starch particles present in the composition. Preferably, half the weight content of the polyvinyl acetate is in the form of sub-micron particles and the other half consists of particles averaging 8–12 microns in diameter. Preferably, the amount of polyvinyl acetate and starch in the dispersion should be in the range of 0.5% to 2.0%, based on the weight of the disperse medium, i. e., water. Concentrations below the lower limits are ineffectual for producing best results. Concentrations of polymer and starch greater than 2.0% are likely to result in the formation of a hazy coating which is highly undesirable in substantially transparent thermoplastic films. The actual percentages of these materials in the composition depend upon the speed of the film past the spray guns. In the examples listed below, the film is sprayed at only 50–60 feet per minute. At higher film speeds, a considerably more concentrated composition may be employed in order to deposit the required amount of solids on the film.

The spray bath may also contain small amounts of suitable anti-static materials. These, by reducing the tendency of slip-promoting particles to accumulate electrostatic charges, still further reduce their tendency to transfer from the film to other surfaces. Alternatively, the film may be passed through an aqueous solution of a suitable anti-static agent, for example, a solution containing about 0.50% of a water-soluble alkyl aryl polyether alcohol with or without 0.05–0.20% of zinc chloride followed by a passage through squeeze rolls to remove the excess solution; the wet film is then sprayed with an aqueous composition containing polyvinyl acetate (in dispersion form) and rice and corn starch or other suitable starch particles.

Certain varieties of natural starches, such as corn and rice starches, are found to be particularly effective as slip and anti-blocking agents. These materials tend to approach spherical or spheroidal shapes which give better slip since minimum area of contact with the film surface is presented. The diameters of particles of these starches should fall within the acceptable range of 5–30 microns, with the long axis being not more than 2–4 times their shorter axis. The preferred average diameter for sizing of polyethylene film is 8–12 microns, though good results can be obtained with smaller and larger diameters such as 4–8 and 10–30 microns.

The sprayed film is dried in air at or above the softening temperature of the polyvinyl acetate which is approximately 115° C. The air temperature may be considerably higher than the softening temperature of the film (up to 135° C. in the case of polyethylene film) provided the film moves too fast to become heated to the air temperature. The softened polyvinyl acetate particles become attached to the film and to the starch particles, and the coarser slip-promoting (starch) particles adhere to the film without causing appreciable impairment of certain physical properties of the film, such as printability, and in the case of such heat-sealable films as polyethylene, the heat-sealing properties.

The following examples will serve to further illustrate the principles and practice of the invention. Parts and percentages are by weight unless otherwise indicated.

EXAMPLE 1

Melt-extruded, ethylene polymer film 0.0015 of an inch thick was sprayed with an aqueous sizing composition containing: 1.00% polyvinyl acetate dispersion solids containing particles ranging from less than 1 to 5 microns in diameter, 1% rice starch, 0.10% of zinc chloride, and 0.05% alkyl aryl polyether alcohol. The film was sprayed at 50–60 feet per minute. The sized film was then dried at 115° C. for 5 seconds. The amount of starch and polyvinyl acetate applied on the film, calculated from polargraphic determinations of zinc deposited on the film, was approximately 26 milligrams of each per square meter of film (both sides) or 13 milligrams of each per side of a square meter of film. The deposit was discontinuous though uniformly distributed. The slip characteristics and resistance to blocking were greatly improved over that of the unsized film. The clarity was unchanged and the heat-seal strength was unimpaired.

EXAMPLE 2

Melt-extruded, polyethylene film was dip-sized in an aqueous bath containing: 0.50% alkyl aryl polyether alcohol and 0.10% zinc chloride. The film was then spray-sized with the following aqueous suspension: 0.50% corn starch and 1.00% polyvinyl acetate dispersion solids containing particles ranging from less than 1 to 5 microns in diameter; and the film was dried at 115° C. As in Example 1, the slip characteristics of the sized film were greatly improved over that of the unsized film and the heat-seal strength was unimpaired. The electrostatic propensity of the film was low.

EXAMPLE 3

Melt-extruded polyethylene film was dip-sized in an aqueous solution containing half a percent of alkyl aryl polyether alcohol and 0.05% of zinc chloride. The excess of this solution was wiped off, after which the film was immediately sprayed with an aqueous suspension containing 1% of corn starch and 1% of polyvinyl acetate solids containing particles ranging from less than 1 to 5 microns in diameter. The film was then dried at 115° C. for 5 seconds. The sized film had good slip, was non-blocking, showed good anchorage of the starch particles and gave as strong heat-seals as the unsized film. Again, the electrostatic propensity was low.

Table I, which follows, serves to further illustrate the advantages of the process of the present invention.

*Table I*

| Property | Unsized | Examples | | |
|---|---|---|---|---|
| | | 1 | 2 | 3 |
| Slip | None | Good | Good | Good. |
| Coefficient of friction: | | | | |
| Starting | .7 | | .52 | .42. |
| Running | .7 | | .29 | .26. |
| Blocking | Bad | None | None | None. |
| Particle Adhesion | | Good | Good | Good. |
| Heat-Seal Strength, gm. (¾″ x 1½″ Seal, 100° C., 2 Sec., 20 p. s. i.) | 2,200+ | 2,030 | 2,200+ | 2,700+. |
| Appearance | | U [1] | U | U. |

[1] Unchanged.

The coefficient of friction of each film was determined as follows: a rectangular plate of metal linked to an indicator is placed on top of a sheet of polyethylene film supported on a smooth, flat surface. The sheet is then pulled under the metal piece and over the supporting surface at a steady rate. As the metal plate adheres to the moving film, it pulls on the indicator, the extent of the pull being in proportion to the friction between the plate and the film. The coefficient of friction is somewhat higher when the film is first pulled under the block (initial) than when it is running steadily (running). The metal block will give a film-to-metal coefficient of friction; and when the block is wrapped in one or more layers of film and then tested, a film-to-film coefficient of friction is obtained.

Heat-seal strength is a measure of the strength of the bond between two films when they are sealed together by heat and pressure. For the purpose of comparison and definition, the following test is used to measure the strength of the heat-seal bond:

A piece of the film 4″ x 10″, with the grain running in the long direction, is cut into two pieces, 4″ x 5″, handling all pieces by the corner so as not to contact the areas to be sealed. The two pieces 4″ x 5″ are superimposed one on the other so that the opposite surfaces are in contact. The two pieces of superimposed film are then sealed together at each end, at right angles to the grain, with a sealing bar ¾″ wide, heated to 145° C., 20 lbs./sq. in. pressure and 2 seconds contact time. The sealed sheets are then cut in half at right angles to the grain, and each half is cut into 1½″ wide strips, parallel to the grain, from the center of the sheet, resulting in four sets to be tested. Each set of the 1½″ wide sealed strips is opened at the free ends, placed in a Suter testing machine and pulled apart. The force in grams required to pull the strips apart is taken as a measure of the heat-seal bond strength.

I claim:

1. The process which comprises spraying the surfaces of flexible, nonfibrous films of organic, polymeric, film-forming substances with an aqueous dispersion of (1) from 0.5% to 1.0% by weight, based on the total weight of the dispersion, of particles of polyvinyl acetate at least 25%, by weight, of which have maximum particle diameters within the range of 0.5–1 micron, the remaining particles of polyvinyl acetate having maximum particle diameters of from 1–30 microns, and (2) from 0.25% to 1.0%, by weight of starch particles, having maximum diameters of not more than 30 microns, and thereafter drying the sprayed film at an elevated temperature sufficient to soften the polyvinyl acetate.

2. A process, according to claim 1, wherein the films are polyethylene films.

3. A process, according to claim 1, wherein said remaining particles have a maximum diameter of from 5 to 30 microns.

4. A process, according to claim 1, wherein 50% by weight of the polyvinyl acetate particles have a maximum diameter within the range of 0.5–1 micron, and the remaining particles of polyvinyl acetate have an average maximum diameter of from 3–12 microns.

5. A process, according to claim 4, wherein the films are polyethylene films.

References Cited in the file of this patent
UNITED STATES PATENTS

| | | |
|---|---|---|
| 2,653,113 | Banigan | Sept. 22, 1953 |

FOREIGN PATENTS

| | | |
|---|---|---|
| 152,381 | Australia | July 16, 1953 |
| 686,492 | Great Britain | Jan. 28, 1953 |